(No Model.) 2 Sheets—Sheet 1.
J. A. CUMMING.
PLANTING ATTACHMENT.
No. 367,743. Patented Aug. 2, 1887.
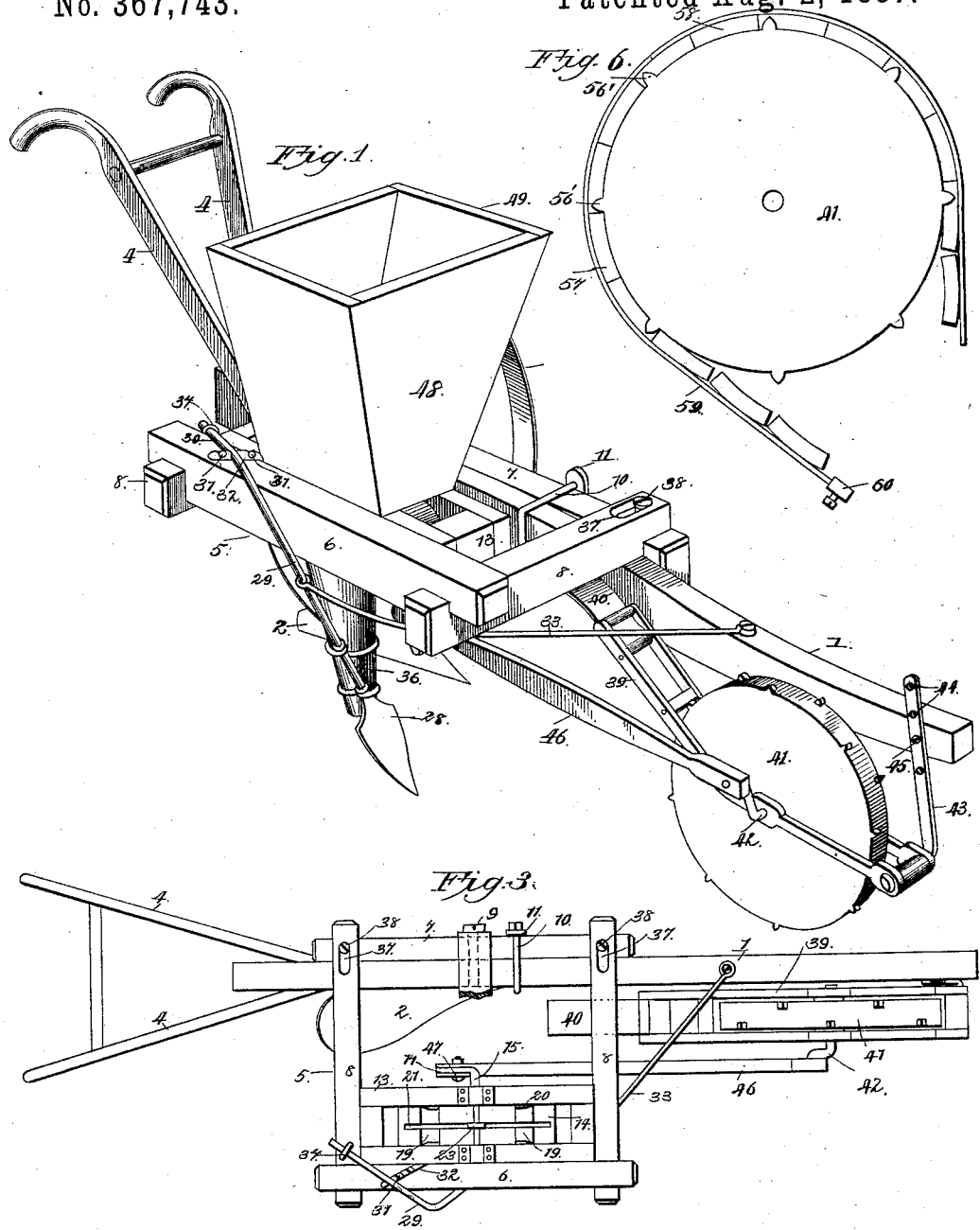
WITNESSES:
M. E. Fowler
E. G. Siggers
INVENTOR
John A. Cumming
BY
C. A. Snow & Co.
ATTORNEYS
N. PETERS, Photo-Lithographer, Washington, D. C.

(No Model.) 2 Sheets—Sheet 2.
J. A. CUMMING.
PLANTING ATTACHMENT.
No. 367,743. Patented Aug. 2, 1887.
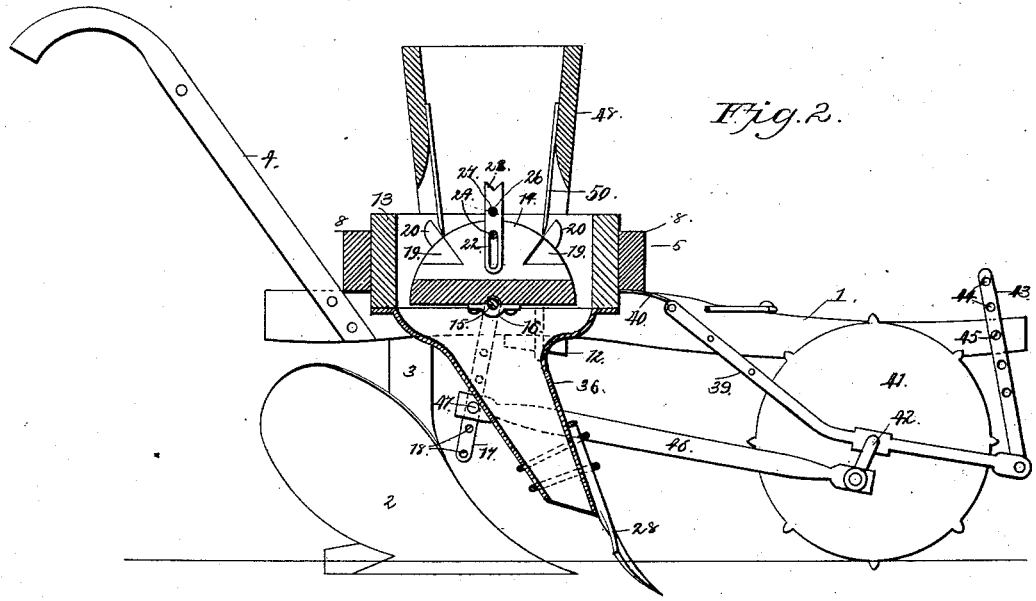
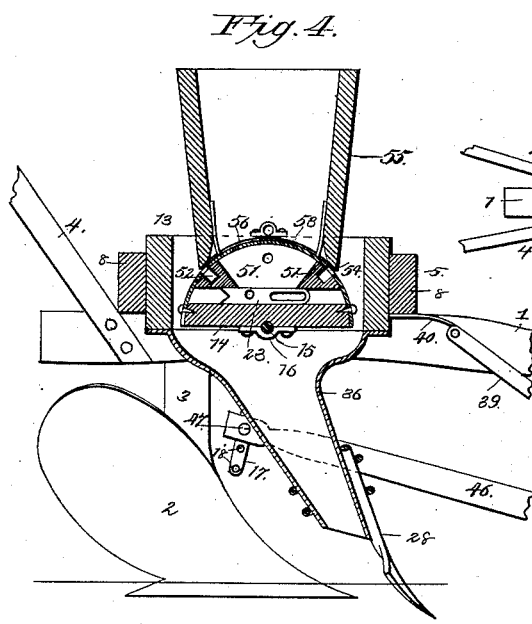
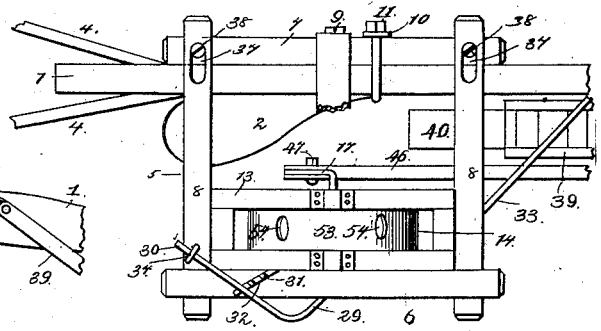

UNITED STATES PATENT OFFICE.

JOHN A. CUMMING, OF CRAWFORD, NEBRASKA.

PLANTING ATTACHMENT.

SPECIFICATION forming part of Letters Patent No. 367,743, dated August 2, 1887.

Application filed May 5, 1887. Serial No. 237,263. (No model.)

*To all whom it may concern:*

Be it known that I, JOHN A. CUMMING, a citizen of the United States, residing at Crawford, in the county of Dawes and State of Nebraska, have invented a new and useful Improvement in Planting Attachments, of which the following is a specification.

Figure 1 is a perspective view of a plow provided with my improved planting attachment, showing the potato-planting attachment in position. Fig. 2 is a longitudinal vertical sectional view of the machine. Fig. 3 is a top plan view with the hopper removed. Fig. 4 is a longitudinal vertical sectional view of the machine used for planting corn or similar smaller seed. Fig. 5 is a top plan view of this form of the machine; and Fig. 6 is a view of the drive-wheel and its additional band, showing the band partly placed on the wheel.

Similar numerals of reference indicate corresponding parts in all the figures.

My invention has relation to planting attachments adapted to be secured to the beam of a common plow; and it consists in the improved construction and combination of parts of such an attachment for a plow which, with a few slight changes, may be adapted to plant potatoes, corn, or various kinds of seed, as hereinafter more fully described and claimed.

In the accompanying drawings, the numeral 1 indicates the beam of the plow, which in this case is shown as a common plow, having one shovel, 2, secured to the standard 3, and having handles 4, in the usual manner, the construction of the plow being, however, immaterial, as a plow of any construction having a shovel or blade upon a standard at the rear end of the beam may be used. A rectangular frame, 5, consisting of two side pieces, 6 and 7, and two end pieces, 8, is secured to the plow-beam, one side piece, 7, being secured to the beam by means of a screw, 9, and by means of a clip, 10, having its arms straddling the beam and side piece of the frame, and having its shackle 11 bearing against the outer side of the beam, a wedge, 12, being preferably placed between one leg of the clip and the under side of the side piece of the frame. A narrow casing, 13, open at the top and bottom, is secured near the other side piece, 6, of the frame, and the segmental seed-slide 14 is pivoted with a transverse shaft, 15, upon the middle of its straight under side in bearings 16 upon the lower edges of the casing, the shaft having a downwardly-projecting arm, 17, formed with a series of perforations, 18, at equal distances.

The seed-slide is formed in its segmental upper side with two notches or recesses, 19, near the ends of the said slide, and two pairs of knives, 20, are secured at the sides of these recesses or notches, projecting radially, and the segmental upper side of the slide is formed with a deep groove or kerf, 21, in the middle of which the inner longitudinally-slotted end, 22, of a flat-pronged bar, 23, is pivoted to rock and slide with the slot upon a bolt, 24. The outer portion of this bar is formed with a perforation, 26, near the outer end of the slot, with which perforation the bar is pivoted to rock upon a transverse bolt, 27, secured in the upper edges of the casing, so that the pronged bar will be rocked when the seed-slide is rocked, the bolt in the kerf sliding in the slot of the bar.

An opening-shovel, 28, is secured to the lower end of a rectangular bent standard, 29, the upper bent end, 30, of which is placed to rest obliquely from the outside in one of a series of notches, 31, in an oblique bar upon the side piece of the frame, being held down toward the notched bar 32 by a bail, 33, and having its end secured to the rear end piece of the frame by means of a hooked nutted bolt, 34. The lower end of the standard is braced by means of an oblique brace, 33, extending from the standard to the forward portion of the plow-beam, and the discharge spout 36 is secured to the lower edges of the narrow casing by hooks or similar fastening means, and has its lower end secured to the opening-shovel by a wire or other suitable means.

The end pieces of the frame are formed with longitudinal slots 37 in the ends above the plow-beam, and are secured to the ends of the side piece by means of screw-bolts 38, so that the width of the frame may be adjusted according to the distance desired between the opening-shovel and the covering-shovel.

A forked frame, 39, is formed with a flat spring-arm, 40, at its upper end and is secured to the forward end piece of the frame, near the middle of the same, and a wheel, 41, is journaled with its crank-axle 42 in the arms of this frame and the ends of the frame are united and secured to the lower end of an arm, 43, having a series of equidistant perforations, 44, and adjustably secured to the forward end of the plow-beam by means of a bolt, 45, the said bar serving to adjust the wheel at the desired height. A pitman, 46, is attached to the crank of the drive-wheel and is pivoted by a nutted bolt, 47, to the perforated arm upon the shaft of the seed-slide, the stroke of the same being regulated by adjusting the end of the pitman at the various perforations in the arm, bringing it nearer to or farther from the shaft.

The hopper 48 is secured above the narrow casing and has one side, 49, projecting over toward the plow-beam, bringing the weight of its contents toward the plow-beam, and at the ends of the narrow bottom aperture of the hopper the hopper is provided with downwardly-projecting flexible strips 50, the ends of which bear against the rocking seed-slide and prevent the seed from passing between the surface of the slide and the ends of the strips.

The above-described form is the potato-planter mechanism, the potatoes being filled into the hopper, being preferably cut into suitable sizes; and it will be seen that as the plow is drawn across the field the opening-shovel will in this case simply follow the furrow made by the covering-plow covering the last row, or it will open a new furrow and the revolving drive-wheel will rock the seed-slide, which will receive a piece of potato in each recess or notch and drop it in the furrow opened, whereupon the plow will cover it, the rocking forked or pronged bar serving to stir the potatoes and prevent them from clogging the discharge-opening, as well as also serving to feed the pieces of potato toward the notches or recesses.

When corn or similar seed is to be planted, the hopper is removed and the pronged bar has the central pivotal bolt removed and is packed into the kerf in the seed-slide. The recesses in this slide are closed by means of blocks 51 fitting in them, and having smaller seed-cups, 52, formed in them, and a flat strip, 53, of sheet metal is secured upon the segmental face of the seed-slide, having apertures 54 registering with the seed-cups. A hopper, 55, is secured upon the narrow casing, the said hopper having the side edges, 56, of its bottom aperture cut to fit the segmental surface of the seed-slide, and the lower edges of this hopper are provided with rubber strips of slitted flexible material, which will serve to sweep the superfluous seed off from the surface of the slide and prevent it from dropping out between the surface of the slide and the edges of the hopper.

The operation of the seed-planting mechanism is similar to the operation of the potato-planting mechanism; and it will be seen that when the end of the pitman is secured to the lower perforations of the arm of the seed-slide shaft the throw of the slide will be shorter, and the seed-cups will only be partly uncovered within the bottom aperture of the hopper, only allowing them to be partly filled with seed, while when the pitman is shifted to the upper perforations the seed-cups are entirely uncovered and the quantity of seed filled into them will be proportionally greater, so that the quantity of seed planted may be adjusted by the adjustment of the pitman in the arm of the slide.

If it is only desired to plant at long distances between each hill, the one of the seed-cups may be filled; but if it should be desired to plant at distances somewhat greater than the distances planted with the present size wheel, and at smaller distances than planted with the seed-cup closed, the wheel, which is provided with a number of equidistant studs or transverse ribs, 56', upon its tire, has an additional band, 57, secured upon it, the said band consisting of a number of blocks, 58, fitting between the studs or ribs and secured with their outer sides to a flexible band, 59, the ends of which may be secured together and to the rim of the wheel by a suitable clasp and screw, 60, and it will thus be seen that the wheel may be made with a greater periphery and will consequently cover a greater distance during each revolution, planting the hills at greater relative distances.

By having the hopper formed with one side overhanging the plow-beam the weight of the seed in the same will be thrown over toward the beam and the plow will be well balanced, and the wheel will carry the greater part of the weight of the hopper and attachment, so that the plow will not be heavier to draw or to operate than it is without the attachment.

The flat spring portion of the wheel-frame will serve to allow the wheel to yield to any inequalities in the surface of the ground without having the wheel slipping upon the said inequalities, so that the wheel will continually operate the seed-slide and will cause it to drop the seed at regular intervals, the spring besides preventing any severe jarring of the machine.

Having thus described my invention, I claim and desire to secure by Letters Patent of the United States—

1. In a planting attachment for plows, the combination of a plow, a frame secured to the beam and having the planting mechanism, and a forked frame, 39, having a flat spring-arm, 40, secured to the frame, and having its forward end secured to the forward end of the plow-beam by a vertically-adjustable brace or bar, and having a drive-wheel journaled in it connected to and driving the planting mechanism, as and for the purpose shown and set forth.

2. In combination with a plow, a rectangular frame clipped to the plow-beam and having a hopper and a rocking seed-slide, an opening-shovel having a bent standard secured with the bent end to the side piece of the frame by means of a clip and a hooked screw-bolt, and having the discharge-spout secured to it, and a forked frame having its upper end yieldingly secured to the frame, and having its forward end supported below the forward end of the plow-beam, and having a drive-wheel journaled in it and connected to the planting mechanism, as and for the purpose shown and set forth.

3. In a planting attachment for plows, the combination of a drive-wheel having equidistant studs or transverse ribs upon its rim, with an additional rim composed of curved blocks fitting between the studs or ribs, and a flexible band having the blocks secured to it, and having means for securing its ends together and to the rim of the wheel, as and for the purpose shown and set forth.

4. In a planting attachment, the combination of a narrow casing having the hopper secured to it, a segmental seed-slide pivoted to rock upon a shaft at the middle of its straight under side in the casing, and formed with two notches or recesses in its periphery, and with two pairs of knives at the sides of the recesses and with a kerf in its segmental side, and a longitudinally-slotted pronged flat bar having its slotted portion fitting upon a bolt in the middle of the kerf, and having its middle pivoted upon a transverse bolt in the casing, as and for the purpose shown and set forth.

5. A planting attachment for plows, comprising the laterally-adjustable frame adapted to be secured to and project beyond one side of the plow-beam, said frame carrying a hopper and seeding mechanism therein, the seed-spout depending from the frame, the furrow-opener attached thereto, and the forward-extending fork frame or arm having the operating-wheel connected to the seeding mechanism, and the brace 43, to connect the forked arm to the front end of the beam, substantially as described.

In testimony that I claim the foregoing as my own I have hereto affixed my signature in presence of two witnesses.

JOHN A. CUMMING.

Witnesses:
W. H. FANNING,
E. W. DAILY.